United States Patent [19]
Ferri

[11] 3,999,485
[45] Dec. 28, 1976

[54] AMMUNITION FOR TOY-WEAPONS
[76] Inventor: Giampiero Ferri, via Stopponi 38, I-50131 Florence, Italy
[22] Filed: July 9, 1974
[21] Appl. No.: 486,806
[30] Foreign Application Priority Data
July 10, 1973 Italy ................................. 9544/73
Dec. 7, 1973 Italy ................................. 9714/73
[52] U.S. Cl. ............................................... 102/86.5
[51] Int. Cl.² ....................... F42B 4/02; C06C 7/00
[58] Field of Search ................................... 102/86.5
[56] References Cited
UNITED STATES PATENTS
3,318,245  5/1967  Ferri et al. ........................ 102/86.5

FOREIGN PATENTS OR APPLICATIONS
1,236,384  3/1967  Germany ........................ 102/86.5

*Primary Examiner*—Verlin R. Pendegrass
*Attorney, Agent, or Firm*—Eugene J. Kalil; James M. Rhodes, Jr.

[57] ABSTRACT

Ammunition for a toy weapon comprises a thermoplastic support having seats containing explosive charges. A cover is moulded onto the support and is welded thereto, the cover serving to seal the charges within the seats.

15 Claims, 18 Drawing Figures

AMMUNITION FOR TOY-WEAPONS

FIELD OF THE INVENTION

The present invention relates to ammunition for toy-weapons.

SUMMARY OF THE INVENTION

According to one aspect of the invention, there is provided a process for the production of ammunition for toy-weapons, said process comprising the steps of forming a support having a plurality of seats for explosive charges, by injection moulding a thermoplastic material in a first injection mould, depositing explosive substance in said seats, arranging the support with the explosive charges in a second injection mould, and forming, in said second mould, a cover for the explosive charges using a thermoplastic material which is welded to the support.

The support is preferably shaped with contours forming channels and/or shoulders which constitute a labyrinth between adjacent seats, and the cover is shaped to mate with said contours to form labyrinths between the seats in order to prevent ignition of adjacent charges by flame propagation.

According to another aspect of the invention, there is provided in ammunition for a toy weapon, a moulded synthetic resin support, said support including means defining a plurality of seats, explosive charges in said seats, and a cover of synthetic resin, injected onto the support and the explosive charges, said cover being welded to the support and sealing said seats.

Preferably, each of the seats has a wall portion of reduced thickness which yields under the pressure of the gases generated during explosion of the charge.

The support and the cover can advantageously form labyrinths arranged to prevent ignition in adjacent seats by flame propagation.

The adjacent seats formed in the support can have bottom walls alternately of a greater and a lesser thickness, the cover having a lesser thickness in correspondence of those seats with the greater thickness bottom wall, and a greater thickness in correspondence of those seats with the lesser thickness bottom wall. The ammunition can thus be fired from each of its opposite sides. The seats can be defined by annular lateral walls which define a labyrinth arrangement with the cover; the thicker portions of the cover extend into their associated seats, and the thinner bottom walls, and thinner portions of the cover are engageable with a percussion member of the perforating needle or pin type.

The ammunition can be of disc-like form with the seats being defined by recesses distributed around an annular zone. Reference and/or engaging means — for a mechanism in the weapon for advancing the ammunition — can be provided on the opposed surfaces of the ammunition, to allow the accurate and positive location and use of the ammunition in two orientations in the weapon whereby one set of charges can be fired in one of the orientations, and the other set of charges can be fired in the other orientation.

BRIEF DESCRIPTION OF THE DRAWINGS

Embodiments of the invention will be now described, by way of example only, with reference to the accompanying diagrammatic drawings, in which.

DESCRIPTION OF THE PREFERRED EMBODIMENTS

Figure 1:
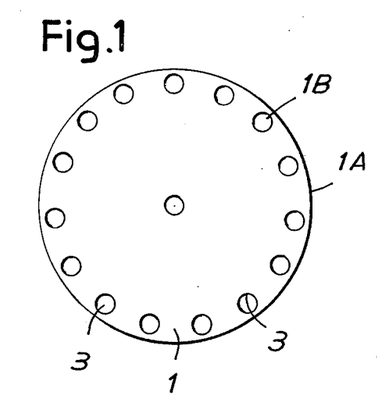
FIG. 1 is an elevation of a moulded thermoplastic support of a first embodiment of ammunition in accordance with the invention.
Figure 2:
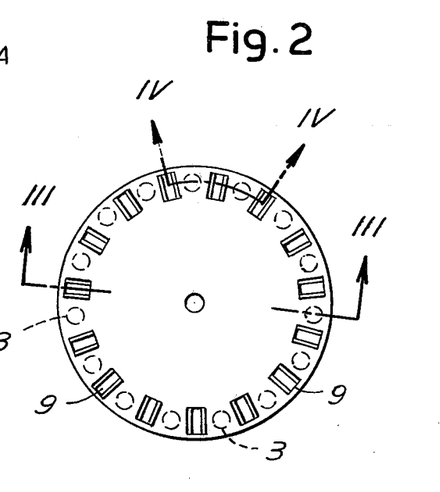
FIG. 2 is an elevation of the ammunition in its completed state.
Figure 3:
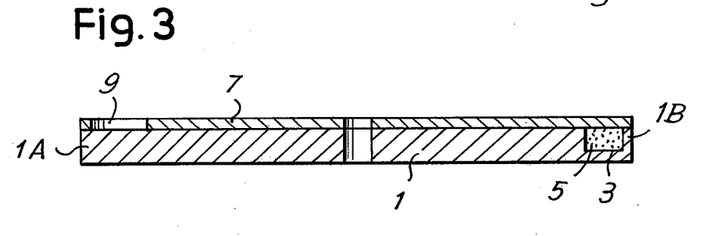
FIG. 3 is a section, to an enlarged scale, taken on line III—III of FIG. 2.
Figure 4:
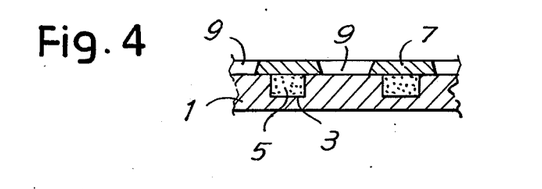
FIG. 4 is a section, to an enlarged scale, taken on line IV—IV of FIG. 2.
Figure 5:
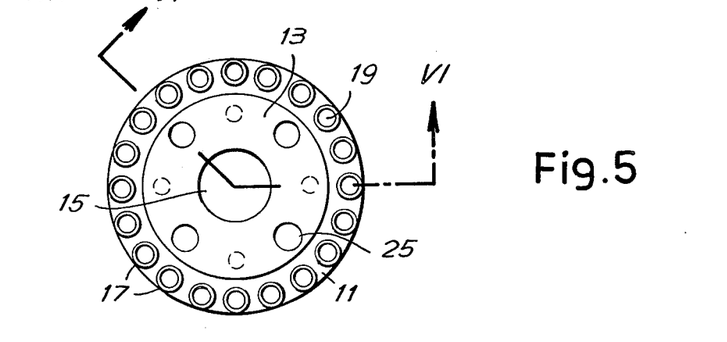
FIG. 5 is an elevation of a moulded support of a second embodiment of ammunition in accordance with the invention.
Figure 6:
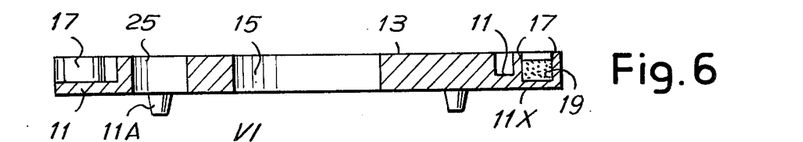
FIG. 6 is a section, to an enlarged scale, taken on line VI—VI of FIG. 5.
Figure 7:
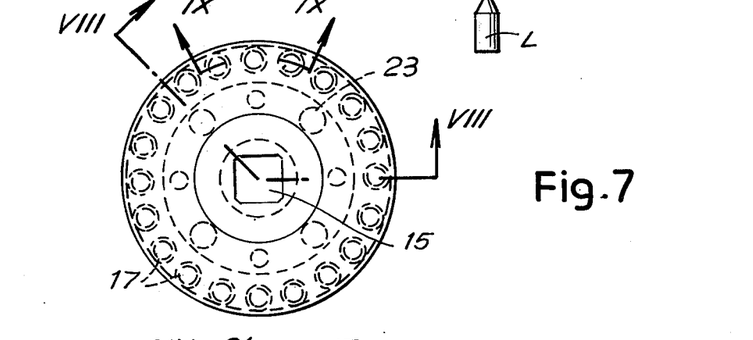
FIG. 7 is an elevation showing the ammunition of the second embodiment in its completed state.
Figure 8:
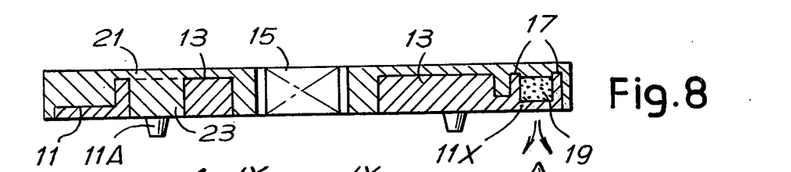
FIG. 8 is a section, to an enlarged scale, taken on line VIII—VIII of FIG. 7.
Figure 9:
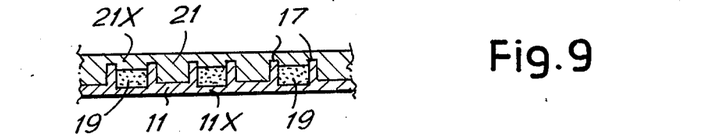
FIG. 9 is a section, to an enlarged scale, taken on line IX—IX of FIG. 1.
Figures 10, 11:
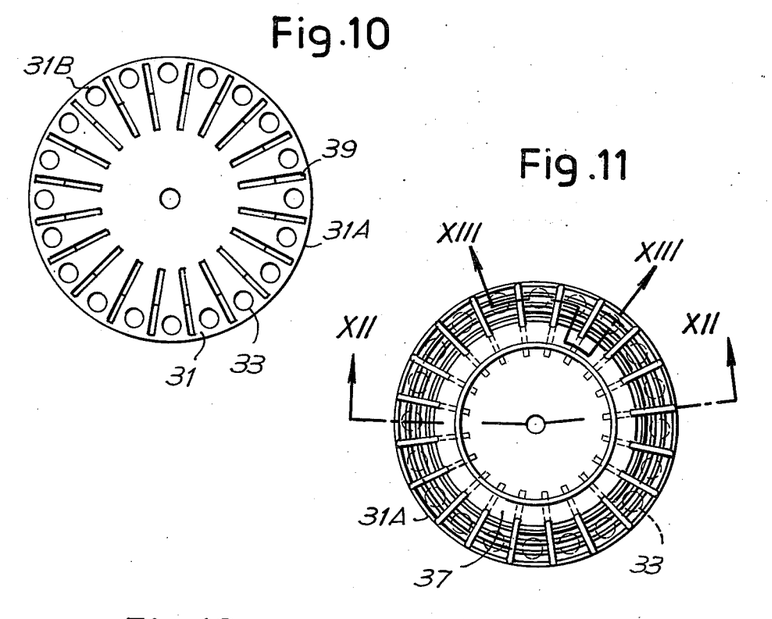
FIG. 10 is an elevation of a support of a third embodiment of ammunition in accordance with the invention.
FIG. 11 is an elevation showing the ammunition of the third embodiment in its completed state.
Figure 12:
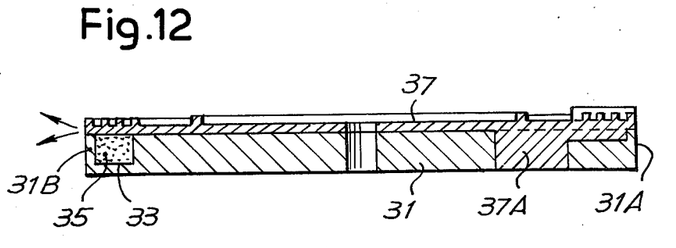
FIG. 12 is a section, to an enlarged scale, taken on lines XII—XII of FIG. 11.
Figure 13:
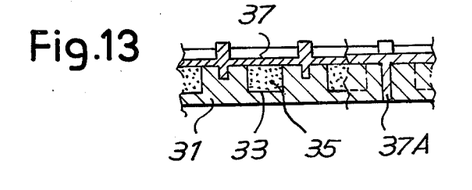
FIG. 13 is a section, to an enlarged scale, taken on line XIII—XIII of FIG. 11.

With initial reference to FIGS. 1 to 4, there is shown disc-like ammunition having charges distributed around an annular zone at the peripheral edge portion of the ammunition. More particularly, the ammunition comprises a moulded thermoplastic resin support of disc-like form which has (as shown in FIG. 1) a ring of seats 3 in the form of recesses each of which accommodates a charge 5 of explosive substance; the volume of each charge 5 is very small and corresponds to the volume of the seat 3.

After the explosive charges 5 have been located in the seats 3, the support 1 is introduced into a thermoplastic injection mould and a thermoplastic cover 7 is injected across the upper surface of the support 1. The cover 7 is relatively thin but is adequate to ensure sealing of the explosive charges 5, while the possibility of the cover 7 becoming detached from the support 1 is obviated since these two parts are welded together. The thickness of the cover 7 is sufficiently reduced to allow ignition of the charges 5 by a needle-type percussion pin or a hammer-type percussion unit.

The cover 7 is provided with a plurality of openings in the form of windows 9 each of which faces the space between two adjacent seats 3, the windows 9 having flared or other shaped edges. The seats 3 are arranged relatively close to the periphery 1A of the support 1 in such a manner as to form a relatively thin wall zone 1B between the outer edge of the seats 3 and the periphery 1A, the wall zone 1B preferably being thinner than the thickness of the cover 7 in correspondence of the seats 3; moreover the wall zone 1B is weaker than the bond between the cover 7 and the support 1 in the zone of minimum distance between a seat 3 and the edge of a window 9 adjacent thereto. Consequently at the moment of the explosion, the charge 5 causes the relatively weak wall zone 1B to tear laterally, while escape of the explosive gas in other directions is prevented or at least substantially restricted. If, due to the explosion, the cover 7 does become detached from the support 1 in the zone defined between the seat of the exploding charge and an adjacent seat with a charge still to be exploded, this latter charge will not be ignited since the explosive gases will be discharged through the window 9 defined between these two seats, whereby the gases will be dispersed without reaching the charge still to be exploded.

The presence of the depressions formed by the windows 9 can also be used to obtain angular step-wise movement of the ammunition, in a weapon which has a suitable indexing system for this purpose.

The ammunition described above is advantageous in that the process of injecting the cover allows a seal to be obtained which is positive and direct between the two layers defining the single cavities for the explosive, without the intervention of solvents, adhesives or the like. This enables, as described above, one charge to be exploded without causing ignition of an adjacent charge. There is also obtained an increase of the acoustic effect with a given charge; thus a smaller charge can be used than used hitherto to provide the same acoustic effect, this being due to the large resistance provided by the seal to expansion of the explosive gases.

The injection of the cover also allows uniform compression of the charges when the cover material is injected under a high pressure. In this manner, there is obtained a reduction of the volume of the individual charges while providing the same explosive effect, uniformity of the explosive effects of the different charges, better ignition of the entire charge, and ease of ignition when using percussion pins having small dimensions and thus small power.

As to safety, substantial advantages are obtained with respect to previously proposed ammunition. The improved and complete ignition of the charge avoids an extension of the time for the explosion, and avoids projection of pieces of an unexploded charge upon partial ignition.

Further the positive seal of the seats 3 obviates dispersion of explosive particles in packages for the ammunition and in storage. An additional safety aspect is that of safety during handling and improper use of the ammunition.

The ammunition is also efficiently protected against the adverse effects of atmospheric agents and of ambient conditions on the explosive charges, and in particular enables complete protection against the ingress of moisture.

The ammunition can be formed with fire-baffle labyrinths and walls with a stable and intimate coupling which makes these arrangements much more efficient than in previously proposed arrangements.

The charges can be fired with a needle-type percussion pin without the need for an anvil; the resulting flame is in the form of a very restricted jet in a direction which is transverse to the direction of movement of the percussion pin. This arrangement provides the following advantages: the mechanism of the weapon can be protected against damage by the action of the burnt or non-burnt residues; the shock wave can be immediately expanded on the outside thus obviating the use of pilot-conduits in which shells may be included; dirtying of the anvil can be avoided whereby efficient action of the reaction point opposite the percussion pin can be maintained for a long time; and a pointed ignition pin can be used to contain the extent of the applied force within such limits as to facilitate the design of the weapons with which the ammunition is to be used.

The explosive charge being contained in a closed hermetically sealed explosion chamber, of which only a thin wall is deformed during the explosion to allow expansion of the flame outwards, provides the following advantages: the explosive charge or mixture is completely burnt and there are no nonburnt residues projected towards the outside; all the dosing is concurrent to provide realistic acoustic effects of a round being fired; the gases, before being expelled cause mechanical deformation, and their outward expansion is substantially instantaneous, whereby an acceptable round can be obtained using small amounts of explosive, for example about 3.5 mg., this being less than one half of the quantity used in previously proposed ammunition, thereby increasing the safety factor of the ammunition; the explosive remains very stable and active over long periods because it is preserved from direct contact with the surrounding atmospheric and ingress moisture is prevented.

It is substantially impossible for the charges to self-ignite; owing to the particular shape of the ammunition, each explosive charge is separated from the adjacent charges by a protective baffle, and/or by gas expansion zones, whereby the only possible direction for the exit of the flame is that imposed by the desired reduction of thickness of a wall zone.

The ammunition can withstand rough handling, whereby it may be easily entrusted to children and does not require particular packaging or wrapping arranged to prevent ignition of the charges.

In a modified arrangement a protective baffle which provides a labyrinth, may be used to separate adjacent charges arranged around the circumference of the ammunition, thus avoiding the use of windows such as those denoted by 9 in FIGS. 1 to 4.

In the embodiment of FIGS. 5 to 9, there is shown a labyrinth-type arrangement for separating adjacent charges. More particularly, the ammunition comprises a disc-like support 11 injection moulded in a first mould; the support 11 is provided with a relatively thick central portion 13 with a hole 15. A plurality of annular collars 17 are formed around the periphery of the outer edge of the portion 13, tangential to the periphery of the support 11, and define seats for explosive charges 19. Several supports 11 can be carried by trays or plates to which the supports can be engaged by means of pin-like extensions 11A, the supports 11 being moulded on the trays; the extensions 11A may be removed during working subsequent to molding of the supports 11 and handling same.

When the explosive charges 19 have been located in the seats formed by the collars 17, several supports 11, carried by a tray, are introduced into a second mould, in which a cover 21 is formed for each support in a second injection molding operation, the cover being welded by this operation onto its respective support 11 and also being shaped onto same. In particular one may provide, with the moulding of the cover 21, an exactly disc-like body. In the moulding there is formed in correspondence of the central hole 15, a non-circular hole, for instance a square cross-section hole. Also the periphery of the disc-like body is formed by the cover 21 and the closure of the seats with the explosive charge 19 is ensured, the material of the cover 21 surrounding the collars 17 whereby to form a labyrinth arrangement to prevent the propagation of the flame to adjacent unfired charge or charges. The cover 21 can also be provided with anchoring pins 23 shaped within corresponding holes 25 formed in the support 11 in the portion 13 thereof.

The support 11 can be provided with a relatively thin wall portion 11X in correspondence of the seats defined by the collars 17, or the cover 21 can be provided with a wall portion of reduced thickness in a zone 21X of the cover in correspondence of the seats. In this manner there is obtained the possibility of penetration of an anvil L (see FIG. 8) by the effect of opposed percussion, and of preferential tearing and emission of gases in a desired direction.

On the surface of one of the faces of the ammunition, a set of teeth or recesses can be provided to enable angular stepwise advance of the ammunition in the weapon to enable firing of the successive rounds or bullets. The ammunition can also be advanced by directly seizing or engaging a tooth on one or both substantially smooth surfaces of the ammunition, these surfaces being not very stiff.

Another labyrinth type is shown in the embodiment of FIGS. 10 to 13. In this embodiment, a disc-like support 31 has seats 33 arranged around its peripheral edge portion and containing explosive charges 35. The seats 33 are sealed by a cover 37. The support 31 has, between adjacent seats 33, grooves 39 of an appropriate length; when the cover is formed in an injection mould in which the support 31 with the charges 35 contained in the seats 33 has been introduced, the underside of the cover is provided with ribs 37A within the grooves 39. The wall zone 31B of the supdefined between each seat and the periphery 31A is relatively thin and is torn by the gases during the explosion whereby the gases expand in the desired direction.

Figures 14, 15, 16:
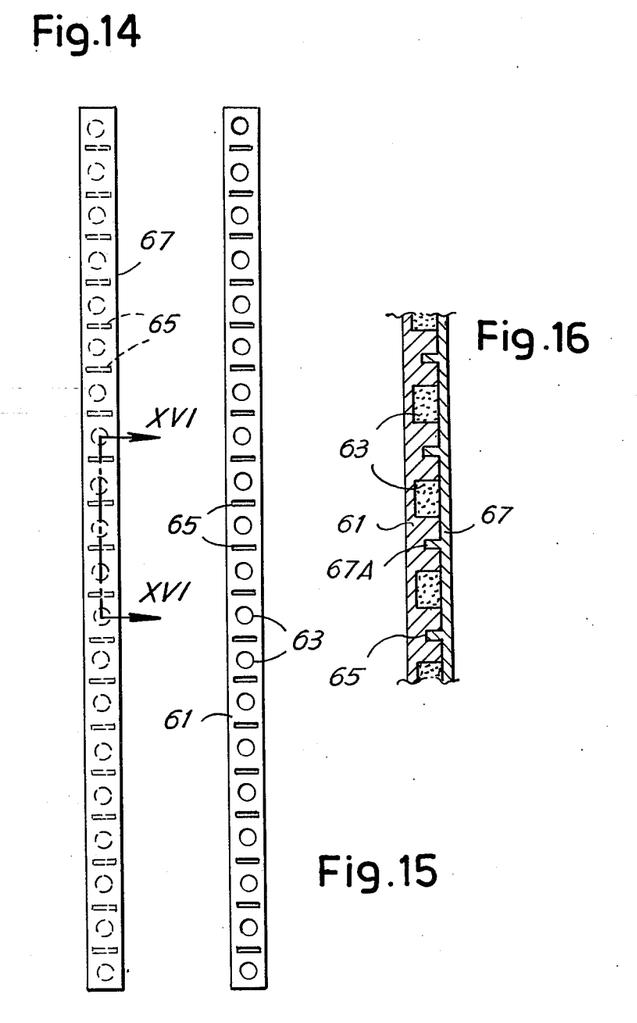
FIG. 14 is an elevation of a fourth embodiment of ammunition in accordance with the invention.
FIG. 15 is an elevation of a support of the ammunition of FIG. 14.
FIG. 16 is a section, to an enlarged scale, taken on line XVI—XVI of FIG. 14.

In the embodiment shown in FIGS. 14 to 16, a rectilinear strip of ammunition of appropriate length is constructed in accordance with similar criteria to the disc-like aummunition previously described. In particular, the ammunition comprises a support 61 which forms seats 63 for explosive charges; the seats are separated from one another by transverse grooves 65. A cover 67 is moulded on the support in a mould containing the support 61 with explosive charges accommodated in the seats 63; the cover 67 is provided in the groove 65, with baffles 67A which prevent the transmission of the flames to an unfired charge from an adjacent exploding charge.

The explosion gases in this embodiment may be laterally expanded, for instance, along an edge of the strip which is closer to the seats 63 than the other edge. Also, the cover 67 can be of such a thickness as to facilitate the action of the percussion pin, and to allow gas expansion or discharge through the cover.

In a modified arrangement (not shown), the cover 67 can be provided with windows instead of the baffles 67A, these windows acting in a similar manner to those of the embodiment of FIGS. 1 to 4.

The strip can have two sets of longitudinally aligned charges, the charges of one set being offset with respect to those of the other set.

Figure 17:
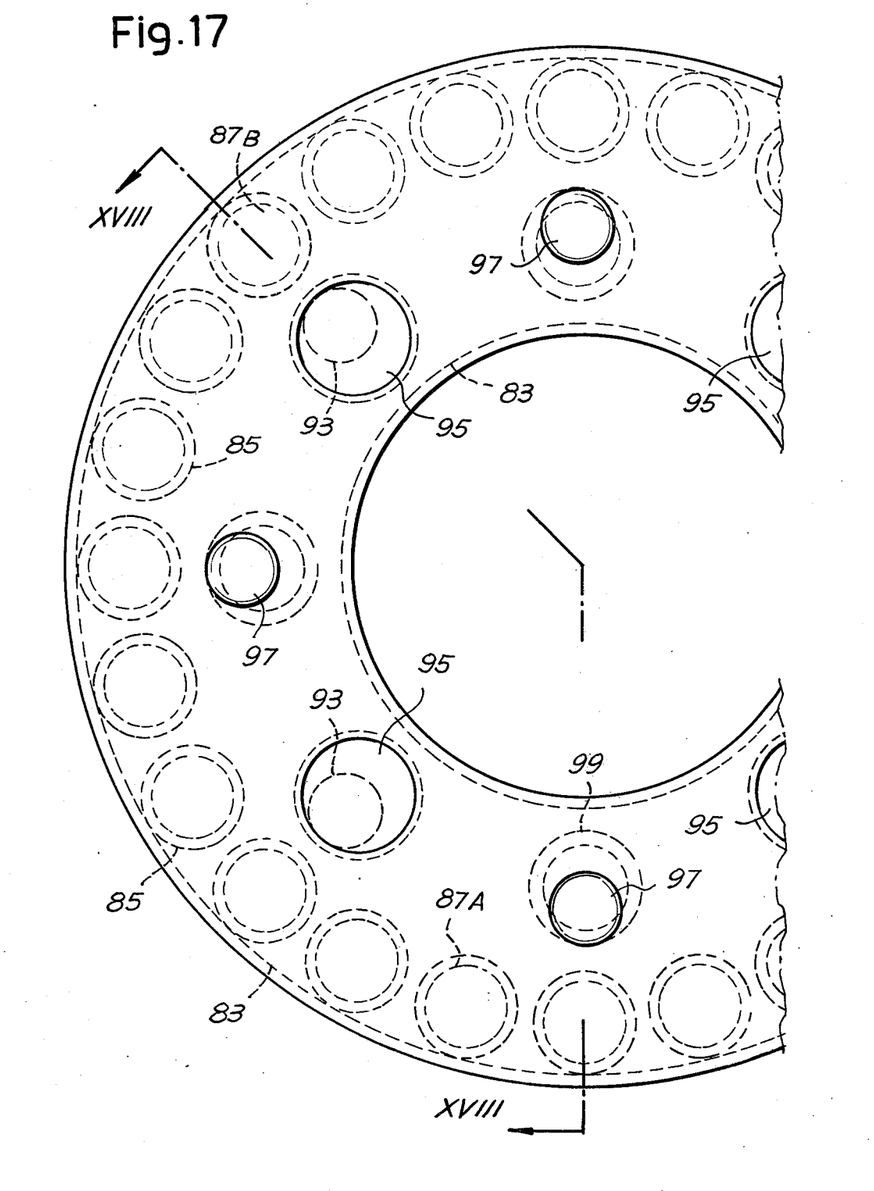
FIG. 17 is a fragmentary elevation of a fifth embodiment of ammunition in accordance with the invention.
Figure 18:
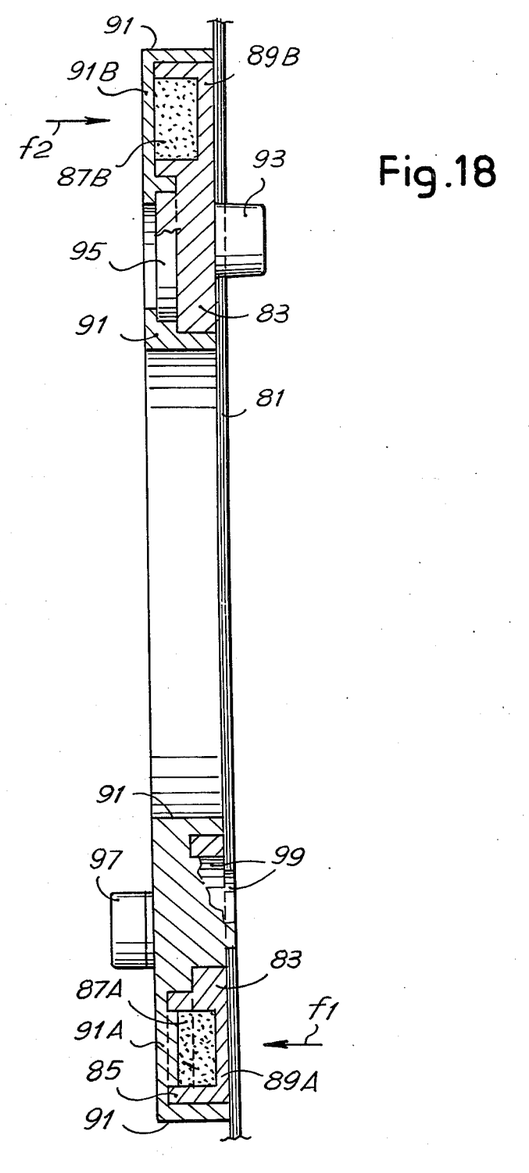
FIG. 18 is a section, taken on line XVIII—XVIII of FIG. 17.

In the embodiment of FIGS. 17 and 18, 81 indicates a supporting plate on which several disc-like supports 83 are simultaneously moulded, in an injection mould. The periphery of the support 83 has a series of annular shoulders 85 which project from the side thereof remote from the plate 81, and define a circumferential rim of seats for explosive charges 87A, 87B. The charges 87A alternate with the charges 87B and may be termed the "even" numbered charges, whereas the charges 87B may be termed the "odd" numbered charges. The seats for the charges 87A are deeper than those for the seats 87B since the bottom 89A of the seats for the charges 87A is thinner than the bottom 89B of the seats for the charges 87B. However, all the charges are of equal volume, for which purpose the charges 87A do not fill completely their respective seats or leave a greater space than the charges 87B in their seats. When the support 83 has been injection moulded and when the charges have been located in their seats, a cover 91 is injection moulded, the assembly of the supporting plate 81 and of the support or supports 83 being located in an appropriate mould, whose cavity or each of whose cavities is partly defined by the support or by each support 83. The cover 91 thus formed is welded to the support 83 and seals the seats for the charges 87A and 87B. The thickness of the portions 91A of the cover 91 in correspondence of the seats for the charges 87A, is greater than the thickness of the portions 91B of the cover 91 in correspondence of the seats for the charges 87B, the thickness of the portions 91B being substantially equal to the thickness of the bottoms 89A, and the thickness of the portions 91A which extend partly into the seats for the charges 87A, being substantially equal to the thickness of the bottoms 89B.

The support 83 has pin-like projections 93 which extend through holes in the plate 81, the pins 93 serving to provide a temporary retaining effect of the support 83 on the plate 81 to permit ease of handling, and to constitute reference and engaging means for the mechanism of the weapon. The support 83 also has extensions 95, which serve for moulding requirements of the cover 91. When moulding the cover 91, there are formed pin-like projections 97 similar to the projections 93, but projecting the opposite direction. The projections 93 are distributed in a predetermined arrangement with reference to the charges 87B and the projections are distributed in an identical arrangement but with respect to the charges 87A. Also, the cover 91 has extensions 99 which are wedged into corresponding holes in the support 83 to ensure the engagement of the cover to the support, the extensions 99 also being located within holes in the plate 81.

As shown in FIGS. 17 and 18 there are provided 24 seats, twelve being for the "even" numbered charges 87A and twelve being for the "odd" numbered charges 87B, and four projections 97 and 93, are provided, each projection being arranged in correspondence of every sixth seat (that is, of every third seat of the corresponding even or odd, series).

This ammunition can be used in a 12-shot weapon constructed for use with conventional ammunition having twice the pitch of that provided between the adjacent charges of the ammunition described above and having four reference housings or seats. When the ammunition is loaded into the weapon with the projections 97 engaged in the reference seats the charges 87A can be fired successively by a percussion pin according to arrow $f_1$ against or even through (if it is a needle-type percussion pin) the reduced thickness of the bottoms 89A of the seats of charges 87A. When all the charges 87A have been fired the ammunition is extracted, reversed and then reloaded into the weapon with the projections 93 located in the reference seats in the weapon; under these conditions, the same percussion pin, acting in accordance with the arrow $f_2$ on the portions 91B of the cover 91 fires the charges 87B.

With existing weapons designed for use with previously proposed ammunition, the ammunition is advanced at each firing through a pitch double that between the adjacent charges of the ammunition described above, such an advance being necessary with the previously proposed ammunition in order to prevent self-ignition of adjacent charges. In the ammunition particularly described, smaller charges can be located closer together, and in the example described above the ammunition can contain twenty-four rounds whereas equivalent previously proposed ammunition would contain only twelve rounds. On the other hand, the loading of the ammunition into the weapon is extremely easy because each of the two possible orientations of the ammunition is associated with a respective series of charges.

In order to facilitate the use of the ammunition, the support 83 and the cover 91 can be of different colors, so that after one series of charges has been fired with for example one color visible on the rear, it is merely necessary to re-load the ammunition with the other color on the rear in order to then fire the charges of the other series.

What is claimed is:

1. A process for the production of ammunition for toy-weapons, said process comprising the steps of: (a) forming a support having a plurality of seats for explosive charges by injection moulding a thermoplastic material in a first injection mould, said support having contours defined by the periphery of the support and the edges of the orifices of said seats; (b) depositing explosive substance in said seats; (c) arranging the support with the explosive charges in a second injection mould; and (d) forming, in said second mould, a cover for the explosive charges using a thermoplastic material which is welded to the support.

2. A process as claimed in claim 1, wherein the support is shaped with means forming a labyrinth between the seats, and the cover is shaped to match the contours of the support thereby forming a continuous labyrinth seal between the seats for preventing ignition of adjacent charges by flame propagation.

3. A process as claimed in claim 1, wherein the cover is moulded with interruptions forming vents between adjacent seats for the discharge of gases produced when a charge is fired.

4. Ammunition produced by a process as described in claim 1.

5. Ammunition for a toy weapon comprising: an injection moulded synthetic resin support, said support including means defining a plurality of seats, explosive charges in said seats, and a synthetic resin cover injection moulded onto the support and the explosive charges, said cover being welded to the support and sealing said seats.

6. Ammunition as claimed in claim 5, wherein said seat-defining means includes wall means, a portion of said wall means being of reduced thickness whereby said portion breaks under the action of the gas pressure generated during the explosion.

7. Ammunition as claimed in claim 5, wherein the support and the cover combine to form a labyrinthine seal means operative to prevent ignition of adjacent charges by flame propagation.

8. Ammunition as claimed in claim 7, wherein said seat-defining means includes annular wall means which, in combination with said cover, forms said labyrinthine seal means.

9. Ammunition as claimed in claim 7, wherein the support has channels between the seats, and the cover has portions located on the channels, said channels and said cover portions forming said labyrinthine seal means.

10. Ammunition as claimed in claim 5, wherein the cover has an opening between two adjacent seats, said opening permitting discharge of gases from one of said seats thereby preventing ignition of the charge contained in the adjacent seat.

11. Ammunition as claimed in claim 5, wherein said ammunition is disc-shaped, and said seat-defining means comprise depressions located in an annular zone around the periphery of said disc-shaped ammunition.

12. Ammunition as claimed in claim 5, wherein said ammunition is disc-shaped and the cover has openings between the seats, said openings forming teeth for enabling stepwise angular advance of the ammunition.

13. Ammunition as claimed in claim 5, wherein said seats include
bottom walls, and said seats are composed of two sets of alternate seats, the bottom walls of one set of alternate seats being thicker than the bottom walls of the other set of alternate seats, the cover having portions of greater thickness in correspondence of said other set of alternate seats than in correspondence of said one set of alternate seats, the outer surfaces of the cover and the support defining opposed sides of the ammunition, said ammunition being arranged to be fired from each of said sides.

14. Ammunition as claimed in claim 13, wherein the portions of the cover in correspondence of the said other set of alternate seats extend into the seats, the thinner bottom walls and the thinner cover portions being arranged for engagement by a needle-type percussion member.

15. Ammunition as claimed in claim 13, wherein said seat-defining means comprise depressions distributed around an annular zone, each of said opposed sides of the ammunition including means enabling the ammunition to be located in the weapon in two orientations, whereby the charges of one set of seats are fired in one of said orientations, and the charges of the other set of seats are fired in the other of said orientations.

* * * * *